United States Patent
O'Neill et al.

(10) Patent No.: US 6,487,519 B1
(45) Date of Patent: Nov. 26, 2002

(54) SYSTEM AND METHOD FOR TIME-TO-INTERCEPT DETERMINATION

(75) Inventors: Mary D. O'Neill, Santa Barbara, CA (US); William H. Wellman, Santa Barbara, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/487,575

(22) Filed: Jan. 19, 2000

(51) Int. Cl.[7] .............................. G04F 1/00; G04F 3/00; G04F 5/00
(52) U.S. Cl. ........................................ 702/176; 342/159
(58) Field of Search .................................. 702/182, 176, 702/40, 49, 127, 143; 342/19, 62, 17, 119, 203, 159; 244/3.15, 3.19

(56) References Cited

U.S. PATENT DOCUMENTS

| | | |
|---|---|---|
| 2,993,121 A | 7/1961 | Esher, Jr. |
| 3,020,397 A | 2/1962 | Pierce et al. |
| 3,162,856 A | 12/1964 | Parquier et al. |
| 3,378,842 A | 4/1968 | Phillips |
| 3,476,921 A | 11/1969 | Jones et al. |
| 3,964,695 A | 6/1976 | Harris |
| 3,982,246 A | 9/1976 | Lubar |
| 4,180,205 A | 12/1979 | Schwartz |
| 4,494,202 A * | 1/1985 | Yueh .......................... 701/302 |
| 4,614,426 A | 9/1986 | Baxter et al. |
| 4,651,647 A * | 3/1987 | Baker .......................... 102/213 |
| 4,734,702 A | 3/1988 | Kaplan |
| 5,249,157 A * | 9/1993 | Taylor .......................... 340/903 |
| 5,265,121 A * | 11/1993 | Stewart ........................ 375/346 |
| 5,541,603 A * | 7/1996 | Read et al. .................... 342/13 |
| 5,592,170 A * | 1/1997 | Price et al. .................... 342/22 |
| 5,625,452 A | 4/1997 | Hasson |
| 5,629,705 A * | 5/1997 | Spettel et al. ................. 342/62 |
| 5,677,761 A | 10/1997 | Hasson |
| 5,684,577 A * | 11/1997 | Kash ....................... 359/139.01 |
| 6,025,795 A * | 2/2000 | Hulderman et al. .......... 342/45 |
| 6,043,867 A * | 3/2000 | Saban ........................ 356/5.01 |
| 6,161,061 A * | 12/2000 | Bessacini et al. .............. 701/1 |
| 6,204,801 B1 * | 3/2001 | Sharka et al. ................ 342/62 |
| 6,244,536 B1 * | 6/2001 | Cloutier ..................... 244/3.19 |
| H1980 H * | 8/2001 | Cloutier ...................... 342/62 |
| 6,279,851 B1 * | 8/2001 | Huss et al. ................. 244/3.15 |
| 6,326,654 B1 * | 12/2001 | Ruden et al. ............... 257/233 |
| 6,369,392 B1 * | 4/2002 | Ruderman et al. .......... 250/372 |
| 2001/0016029 A1 * | 8/2001 | Tumer ...................... 378/98.8 |

* cited by examiner

*Primary Examiner*—Kamini Shah
*Assistant Examiner*—Demetrius Pretlow
(74) *Attorney, Agent, or Firm*—William C. Schubert; Glenn H. Lenzen, Jr.

(57) ABSTRACT

A method and system of time-to-intercept determination for a radiation source using passively-sensed irradiance data. The invention provides a plurality of noise reduction features to reduce the noise present in the data and improve the accuracy of the time-to-intercept computation. The method includes reducing data noise by defining an acceptable noise level and eliminating any excessively noisy data from the time-to-intercept computation. The method further includes constantly updating the time-to-intercept computation by using irradiance values that are advanced in time. Other features of the present invention includes averaging of irradiance values over a time interval, filtering of the irradiance data received by the method, and triggering at a predetermined time-to-intercept. The invention also includes a time-to-intercept system and processor implementing the above method.

38 Claims, 5 Drawing Sheets

SYSTEM AND METHOD FOR TIME-TO-INTERCEPT DETERMINATION

FIELD OF THE INVENTION

The present invention relates in general to time-to-intercept determination and more particularly to a system and a method for accurately determining a closing time between a radiation source and an object by passively sensing the irradiance of the radiation source.

BACKGROUND OF THE INVENTION

Time-to-intercept determination has several important civilian and military applications. Time-to-intercept (TTI) is the amount of time remaining before an object makes contact with ("intercepts") another object. Determination of the TTI is used in civilian applications such as, for example, vehicular motion measurements, factory measurements, astronomical measurements, satellite measurements and aircraft collision avoidance systems. One military and civilian use for TTI determination is in missile warning systems (MWS). In this age of increased conflict and terrorism, both civilian and military aircraft are especially vulnerable to missile attack, particularly from infrared guided missiles. In fact, over ninety percent of military aircraft losses worldwide since 1980 have been the result of infrared guided missile attacks, and there also have been attacks on civilian aircraft. Due to the lack of missile warning, most pilots of the downed aircraft were not aware of the missile firing until the actual hit occurred, thus could not initiate evasive or protective actions. A MWS carried by an aircraft also enhances the effectiveness and the available duration of aircraft self-protection such as flares, which is most effective when used a certain time before the missile intercepts the aircraft. Therefore, in order to be useful and to ensure maximum self-protection and facilitate use of available self-protection resources, the MWS must have an accurate TTI determination.

In both civilian and military applications it is important that the TTI be determined as accurately as possible to avoid possible disaster. For example, an error in the TTI determination may result in lack of effectiveness for a self-protect system, if a flare is dispensed too late or too early. This may mean the loss of an aircraft and human lives. Thus, there exists a need for an accurate, effective and low-cost system and method for TTI determination.

One way to determine the TTI is by using a passive sensor system. This type of system is generally preferred over other types of systems because of the disadvantages associated with the other systems. For example, an active sensor system detects range by measuring pulse-doppler returns. The active sensor system, however, is relatively complex, heavy and costly because of the rangefinding equipment that must be used. Similarly, TTI determination using a triangulation system is costly, slow and requires two sensors with the same field of regard placed far enough apart to achieve the high angular accuracy.

Unlike an active sensor system that employs radar, lidar or other direct range-measuring equipment, a passive sensor system cannot directly measure the TTI and must indirectly measure the TTI. However, TTI can be determined from fundamental physical laws, if the object has a uniform radiation emission (such as thermal self-emissions, electromagnetic transmitting or reflected power). These radiation emissions may be from natural sources (such as the sun) or from artificial sources (such as laser, radar and searchlights).

For example, a passive ultraviolet sensor system indirectly measures the TTI by observing photon scattering effects that are inherent in these short ultraviolet wavelengths. As two objects approach each other this causes a noticeable "diffusion". The main disadvantage of this passive ultraviolet sensor system, however, is that it is not useful in the infrared spectrum where this scattering is virtually nonexistent. Moreover, the detection range in the ultraviolet spectrum is quite short due to the limited transmittance of the atmosphere in this spectral region.

Another type of passive sensor system indirectly measures the TTI by sensing the irradiance associated with an object. In general, this type of system measures the irradiance of the object at two instances in time and computes the TTI from an equation relating irradiance and time. This type of system can use infrared detection, which is advantageous for long-range detection (for example, at the time a missile is launched). Long-range detection is a useful feature of a TTI determination system because it gives the other object (such as a target aircraft) time to use countermeasures (such as evasive maneuvers and infrared jamming devices).

A disadvantage of this type of prior-art system is their succeptability to noise, since the initial irradiance signal measurement is measured at a long range (when the two objects are some distance away from each other, and the signal is weak) is used throughout the computation of the TTI, making the calculations inaccurate. In fact, a major deficiency of prior-art irradiance-based passive sensor systems is that they either completely ignore or inadequately compensate for the adverse effects of noise. Noise can cause significant accuracy problems in the TTI determination.

Therefore, what are needed are a system and a method for TTI determination using an irradiance-based passive sensor system that recognizes, addresses, and adequately compensates for the adverse effects of noise, thereby increasing the accuracy and efficiency of the TTI determination.

SUMMARY OF THE INVENTION

To overcome the limitations in the prior art as described above and other limitations that will become apparent upon reading and understanding the present specification, the present invention includes a method and a system for accurately determining a closing time (or time-to-intercept) between a radiation source and an object. The present invention utilizes a plurality of features to reduce the noise present in the time-to-intercept computation and thus improve the accuracy of the time-to-intercept determination while still remaining relatively inexpensive and simple.

In a preferred embodiment, the invention includes a method for time-to-intercept determination that includes computing the time-to-intercept using at least three irradiance values of a radiation source and reducing noise in this computation by employing a variety of measures. For example, noise present in the irradiance data is monitored to eliminate the use of any excessively noisy data in the computation of the time-to-intercept. Preferably this is accomplished by computing a signal-to-noise ratio value for each irradiance value and comparing this value to a threshold signal-to-noise ratio value. Any signal-to-noise ratio values that do not meet this threshold criteria are rejected; only those irradiance values within an acceptable noise tolerance (threshold) are used in the time-to-intercept computation. This noise reduction helps improve the accuracy of the time-to-intercept calculation.

The method also includes an averaging feature that further enhances accuracy. For example, a minimum time interval is defined by the resolution of the computing device, to prevent singularities and to minimize sample-data noise in the time-to-intercept computation. The time interval between irradiance values having acceptable noise levels is determined. If this time interval is less than the minimum time interval this irradiance data is not directly used in the time-to-intercept computation. Instead, the irradiance data is averaged over the time interval thus providing additional noise suppression and improved accuracy in the time-to-intercept computation.

The time-to-intercept computation is constantly updated by using irradiance data that is advanced in time. This updating means that the previous time-to-intercept computation is replaced with an updated time-to-intercept computation that was computed using irradiance data taken later in time. Since interception is preceeded by closing distance, and since signal strength naturally increases significantly as distance decreases, this updating significantly enhances signal-to-noise ratio, which improves TTI accuracy. without updating, as in prior art schemes, computations are based on initial observations made when the radiation source (such as a missile) is first detected at long range and the signal is just at the acceptable level, hence the noise in the irradiance data is typically still high and the accuracy of the time-to-intercept computed using this data is accordingly low. By constantly updating the computation using irradiance data of the missile as it comes closer, the accuracy of computation is markedly improved.

The time-to-intercept is computed using equations that relate the irradiance values to the time-to-intercept. In addition, the computation uses signal-strength normalization in order to remove the effects of radiation source size (or absolute signal strength). Normalization is based upon assumptions of whether the closing rate follows a constant acceleration or a constant velocity trajectory. Equations for both constant acceleration and constant velocity assumptions have been developed.

The method can signal a warning system when a predetermined time-to-intercept is reached, which takes full advantage of the aforesaid updating process. The likelihood of false triggering, another aspect of TTI accuracy, is reduced, because the accuracy of the time-to-intercept determination is improved by the present invention. It is desirable that the warning system be triggered at a specific time-to-intercept, so that it can cue a prearranged response. For example, if a missile is approaching an aircraft and the time-to-intercept reaches a predetermined time, the warning system can cue the aircraft to release flares or other engage other protective anti-missile techniques at a time of optimum effectiveness. By releasing flares only when they are effective and necessary, limited countermeasure resources can be conserved so the usefulness of the countermeasure system can be extended.

Other features of the invention also improve the accuracy of the invention. For example, filtering of the irradiance data prior to use by the invention helps improve the accuracy of the incoming data and eliminate any extraneous signals. In addition, this filtering can be included in the detection system and can be a continuous filtering. This invention works with irradiance data that is provided as a continuous data stream, as a periodically-sampled data set, or as an aperiodically-sampled data set.

The method of the present invention can be implemented in a system for time-to-intercept determination. This system includes a detection system for providing irradiance data, a timing device for providing timing data, a time-to-intercept processor for providing time-to-intercept data, and a warning system for triggering countermeasures and warning the pilot of impending danger.

The time-to-intercept processor of the present invention includes an input module for receiving and filtering data, a noise threshold module for further reducing noise in the data, and an averaging module for averaging the data over a time interval. In addition, the processor includes a calculation module for calculating the time-to-intercept, and an update module for constantly updating the time-to-intercept using irradiance data that is advanced in time together with clock data to interpolate time-to-intercept between the times of irradiance measurements.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the preferred embodiments, taken in conjunction with the accompanying drawings, which illustrate, by way of example, the principles of the invention.

Referring now to the drawings in which like reference numbers represent corresponding parts throughout.

DETAILED DESCRIPTION OF THE PREFERRED EMBODIMENTS

In the following detailed description of the invention, reference is made to the accompanying drawings, which form a part hereof, and in which is shown by way of illustration a specific example whereby the invention may be practiced. It is to be understood that other embodiments may be utilized and structural and functional changes may be made without departing from the scope of the present invention.

I. Introduction

The present invention includes a system and method for time-to-intercept (TTI) determination using a passive sensor system to measure the irradiance of a radiating source. The TTI is determined by measuring the irradiance from the radiating source at two points in time and subsequently calculating the TTI using an equation that relates the irradiance measurements and the TTI. Later in time the irradiance is measured again at a third point in time and an updated TTI is calculated. By such updating, at least three irradiance values at three respective times are employed to compute TTI. This continuous updating of the TTI calculation is accomplished by using advancing (in time) irradiance measurements. These irradiance measurements can be obtained either as a continuous data stream or an intermittently sampled (periodically or aperiodically) data set.

From the fundamental physics, this invention reveals that TTI is proportional to the ratio of the detected irradiance of the target with respect to the rate of change of the detected irradiance. This equation does not include any of the effects of the radiating source size.

The present invention also includes a plurality of modules and functions to compensate for noise.

One example of noise compensation used in the present invention is continuous filtering of the measured irradiance signals. This continuous filtering ensures that many extraneous signals not associated with the radiating source are filtered from the measurements. Another example is that excessively noisy signals are not used in the TTI calculation. An "excessively noisy" signal may be defined as any signal having a signal-to-noise ratio (SNR) below a certain threshold signal-to-noise ratio $SNR_{threshold}$. The SNR is the ratio of the amplitudes of a desired signal to a noise signal at a point in time. If the SNR of an irradiance signal is below is the $SNR_{threshold}$ then the signal is discarded and another measurement is obtained. Elimination of noisy signals prior to the TTI calculation gives the present invention improved accuracy and speed.

Still another example of noise compensation used in the present invention is averaging. In particular, additional accuracy is achieved by the present invention by averaging those measured signals that have a SNR greater than $SNR_{threshold}$, over some minimum time interval. These noise compensation techniques help the present invention achieve a highly accurate and efficient TTI determination.

II. Structural Overview

Figure 1:
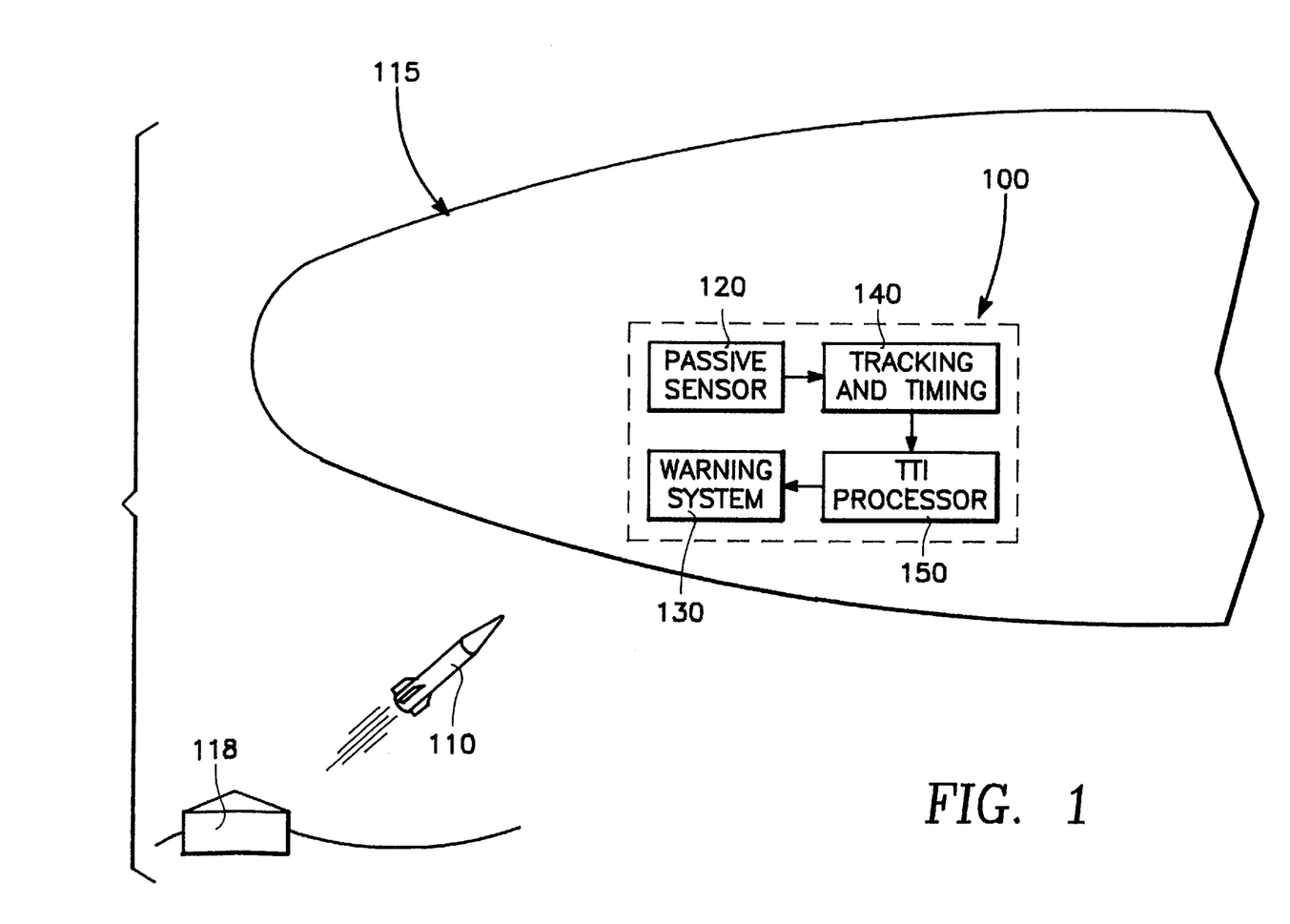
FIG. 1 is an overview diagram of a missile warning system (MWS) incorporating the present invention.

FIG. 1 illustrates one example of how the present invention may be utilized. In particular, FIG. 1 is an overview diagram of a missile warning system (MWS) 100 incorporating the present invention. In this example the radiating source is a missile 110 and the target object is an aircraft 115. The missile 110, shown in flight, has been launched from a ground-based launch facility 118 and is on an intercept path with the aircraft 115. The MWS 100, which is carried on the aircraft 115, can be carried on a variety of host vehicles (such as an aircraft, a ship, etc.) or be located at a stationary host location (such as a building). The MWS 100 can detect and provide warning of the approaching missile 110, as well as determine the TTI between the missile 110 and the aircraft 115. If the TTI is less than a specified time the MWS 100 reacts in a predetermined manner (for example, by activating countermeasure devices such as flares).

The MWS 100 includes a passive sensor system 120 that detects irradiance from the missile 110 and outputs detected irradiance signals. These signals can be a continuous data stream or an intermittently sampled (either periodically or aperiodically) data set. In this example, the passive sensor system 120 measures irradiance in the infrared spectrum and sends the measured data to the Tracking and Timing processor 140. When a threat is declared, the Tracking and Timing processor sends the irradiance and timing data to a TTI processor 130. Alternatively, other spectra, such as radar, acoustic, visible light, and ultraviolet, for example, may be measured. The passive sensor system 120 using infrared detection is suitable for long-range detection and, in this example, the missile was detected at the moment it was launched from the ground-based facility 118.

A system clock resident in the Tracking and Timing processor 140 provides clock and time data to the MWS 100 that is used in the calculation of the TTI. Data from the system clock is sent to the TTI processor 130, where, as explained in detail below, the TTI processor 130 uses this data and data from the passive sensor system 120 to calculate and continuously update the TTI. When the TTI is less than a preprogrammed time the TTI processor 130 can output a signal to a warning system 150 that determines what action to take. For example, when the TTI of the missile 110 and the aircraft 115 is less than the preprogrammed time the warning system 150 can provide a visible or audible alert to the pilot or automatically implement countermeasures.

Figure 2:
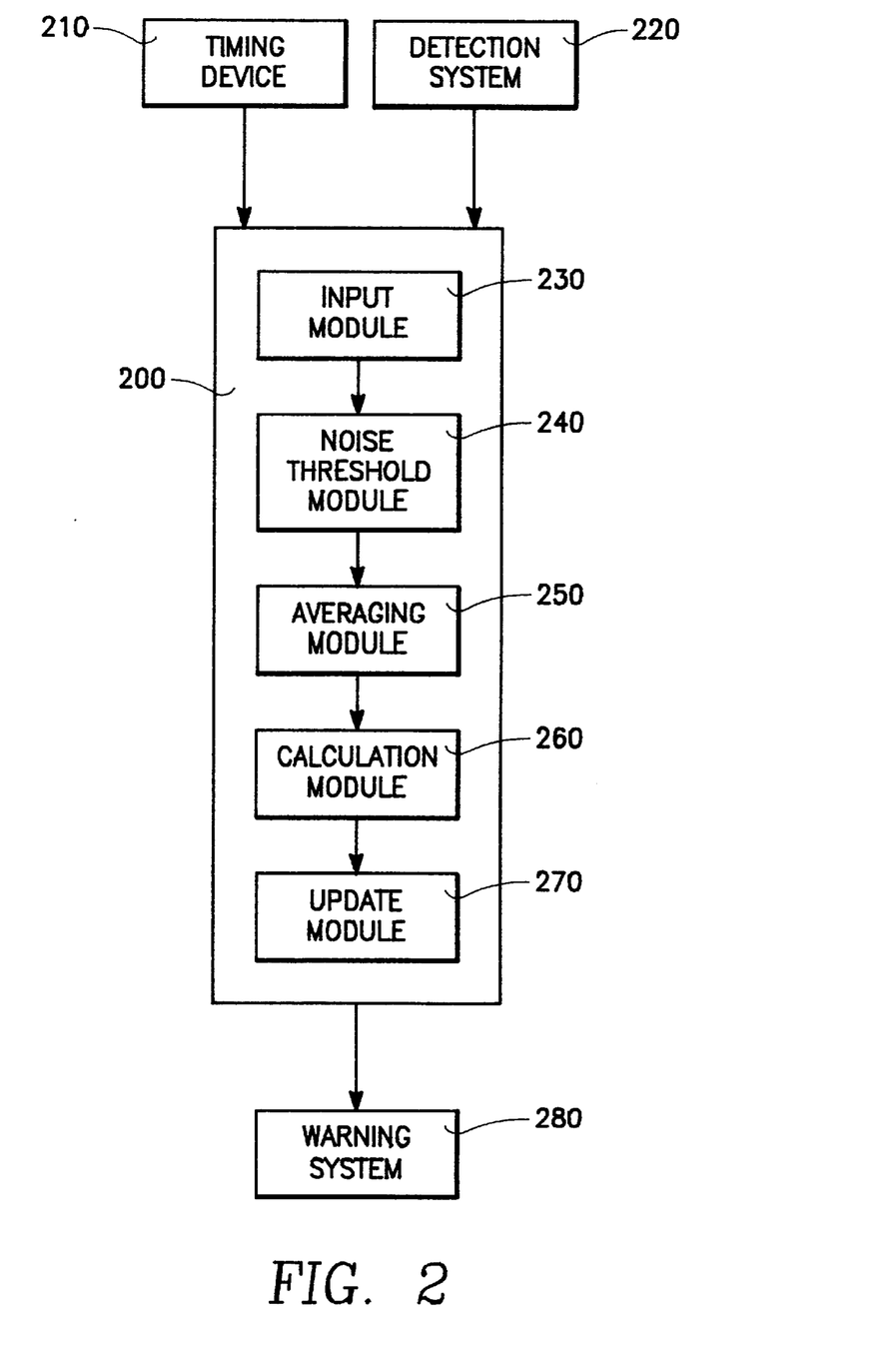
FIG. 2 is a structural block diagram of the present invention.

FIG. 2 is a structural block diagram of a TTI processor 200 (an example of a TTI processor 130 was shown in FIG. 1). The TTI processor 200 receives data from a timing device 210 and a detection system 220. For example, this data can be a time value and an irradiance value of a radiating source measured at an instant in time. The input module 230 receives the incoming data and passes the data to a noise threshold module 240 for elimination of any excessively noisy data. The data that meets this criterion is sent to an averaging module 250 and then to a calculation module 260 where the TTI is calculated. If the data does not meet this criterion, the last TTI is decremented by the timing device 210 in the calculation module 260. The update module 270 replaces the old TTI value with the updated TTI calculation and sends a signal to the warning system 280 if the TTI value is less than a predetermined value.

III. Functional Overview

The present invention can be implemented in hardware or software. The TTI processor (for example, the TTI processor 200 of FIG. 2) can be implemented in hardware using a dedicated logic circuit or a field programmable gate array (FPGA). Alternatively, the TTI processor may contain a microprocessor and memory (such as RAM, ROM and EPROM) for storing and carrying out the method of the present invention.

Figure 3:
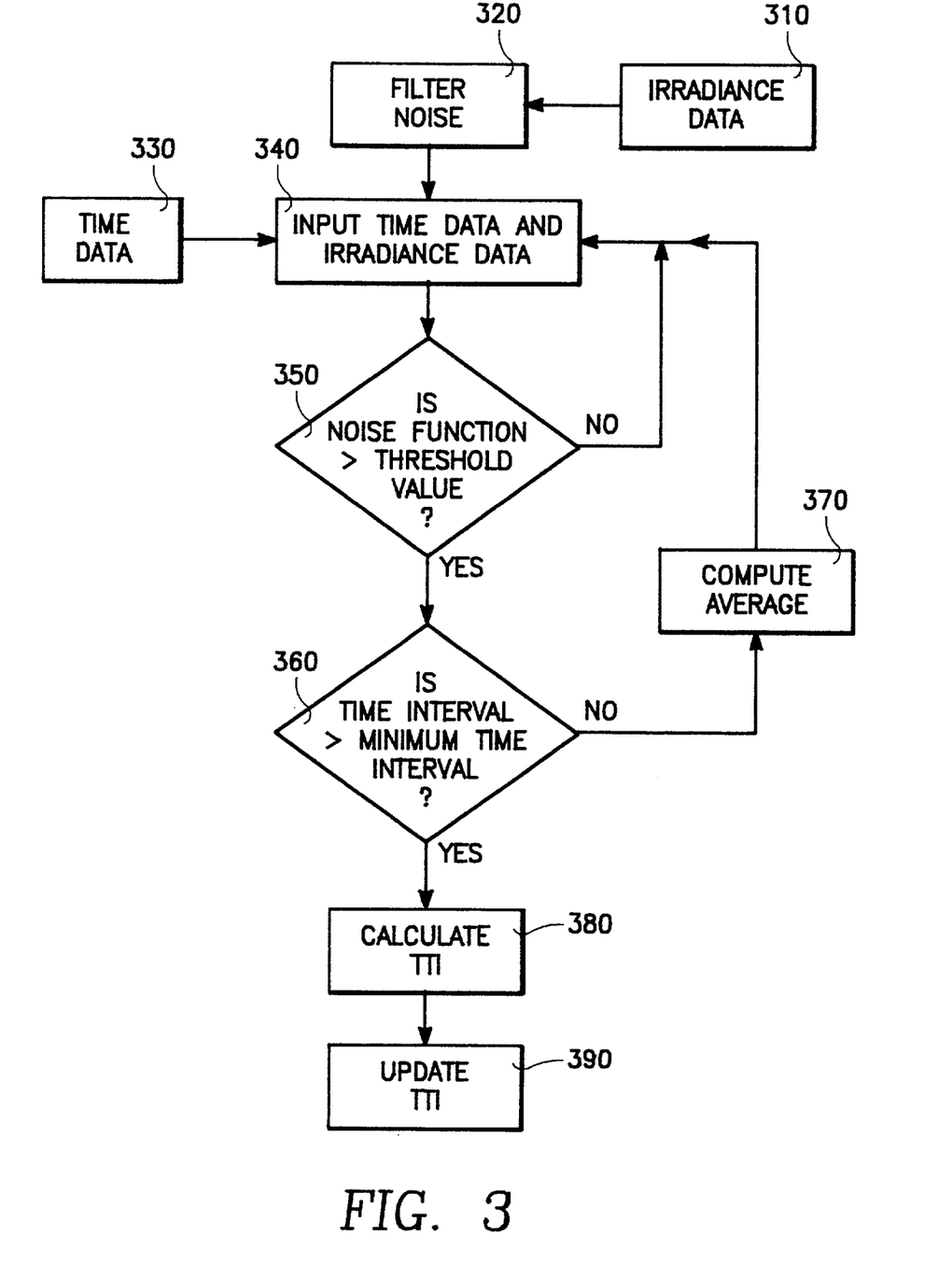
FIG. 3 is a flow diagram illustrating the functional operation of the present invention.

FIG. 3 is a flow diagram illustrating the functional operation of the TTI processor of the present invention. Irradiance data (box 310) from a radiating source is detected and measured by a detection system such as, for example, an infrared-based passive sensor system. As discussed earlier, however, signals in spectra other than infrared may be detected by the detection system and used in this invention. Because the irradiance data may contain extraneous noise, the data is filtered (box 320) to reduce any noise present in the signal. For example, if the irradiance signal is from a missile any extraneous noise (such as photon or electronics noise) is filtered.

Time data (box 330), which may come from a timing device, is used to provide timing information. The time data and the irradiance data is received as input data (box 340).
Noise Threshold Function The present invention includes a noise threshold function to eliminate any excessively noisy detected irradiance signals from the TTI determination. This function can be implemented, for example, within the noise threshold module 240 of FIG. 2. In general, the noise threshold function calculates a noise function of incoming detected irradiance signals relative to a threshold noise values, and eliminates any signals that are less than this threshold. The threshold noise value can be user-selected, determined dynamically or preprogrammed into the function. The present invention does not consider noisy irradiance signals in the calculation of the TTI thus making the TTI calculation more accurate.

As shown in box 350 of FIG. 3, a noise operator of an irradiance signal is calculated to determine if a desired threshold noise value has been exceeded (box 350). Preferably, the noise operator is a signal-to-noise ratio (SNR) of the detected irradiance signal and is compared a certain threshold noise operator (such as a threshold SNR value $SNR_{threshold}$). If the noise operator of the detected irradiance signal is less than the threshold noise operator then the detected irradiance signal is rejected and the noise threshold function returns to box 340 to input a new irradiance signal at a later time (e.g., Z[t+delta t] at a new time [t+delta t].

Figure 4:
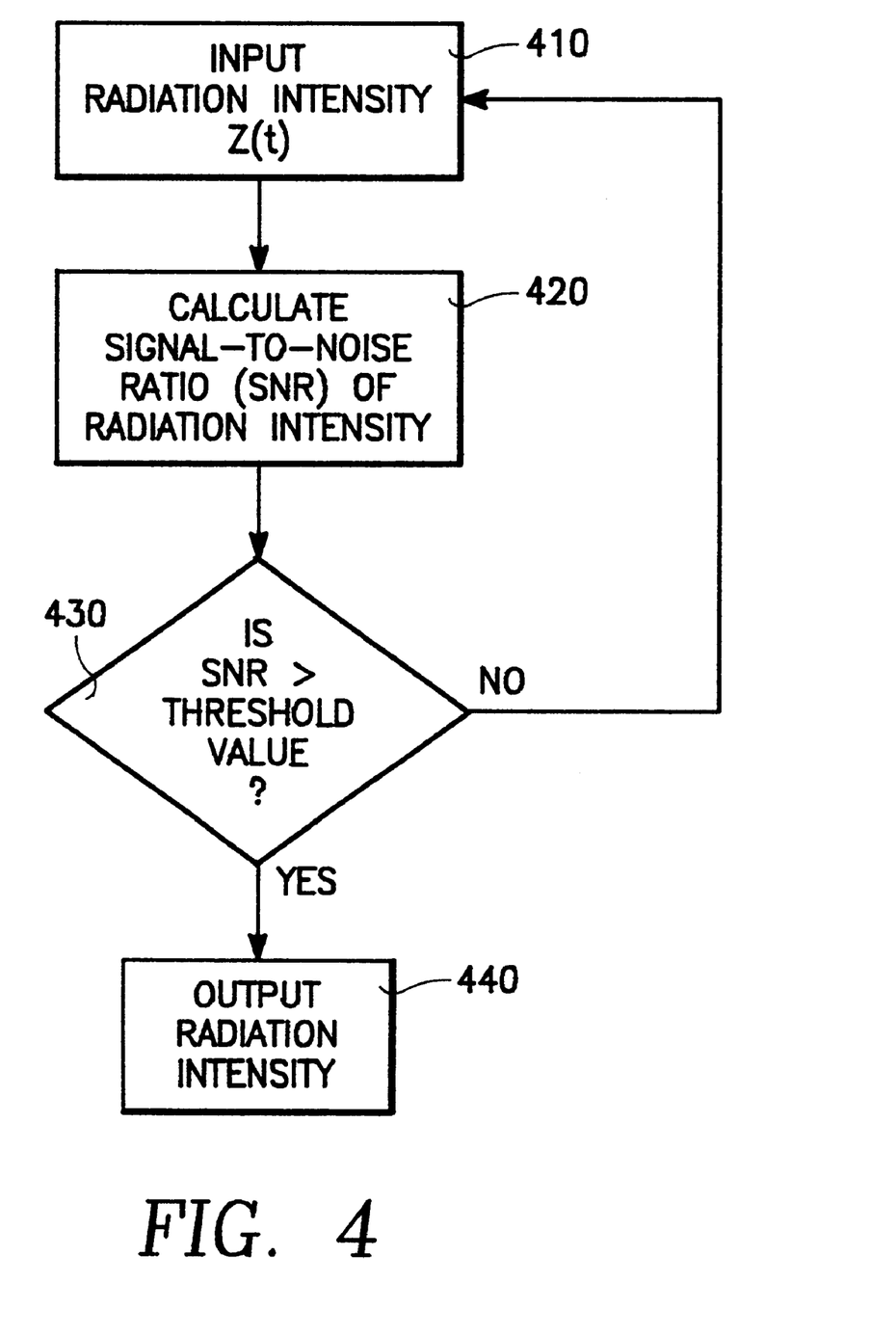
FIG. 4 is a functional flow diagram of a working example of the noise threshold function of the present invention.

FIG. 4 is a working example of the noise threshold function. In this example, the irradiance signal is a detected irradiance at an instant in time, t, and is represented by Z(t). In box 410 the detected irradiance, Z(t), is received by the noise threshold function. This signal is passed to box 420 where the signal-to-noise ratio of Z(t) is calculated. In box 430 the SNR is compared to a threshold SNR value and, if the calculated SNR of the detected irradiance is greater than the threshold SNR value, the detected irradiance is passed to box 440 for output to the next function (for example, the averaging function). Otherwise, the SNR is less than or equal to the threshold value (indicating that the detected irradiance is too noisy to use in the TTI determination) and the noise function returns to box 410 to input another detected irradiance.

Averaging Function

The averaging function of the present invention can be implemented within the averaging module 250 shown in FIG. 2. In general, as shown in box 360 of FIG. 3, the averaging function determines whether a pair of usable irradiance signals has been measured over some minimum time interval. Usable irradiance signals refer to a pair of signals that have passed through the noise threshold function and have minimal noise content. One purpose of imposing a minimum time interval between measured signals is to prevent the possibility of division by zero in the TTI calculation. The time interval must be long enough so that any truncation or rounding off of the time interval will not result in division by zero in the TTI calculation. In addition, a short time interval amplifies the effect of noise in the TTI calculation. The minimum SNR and minimum time interval are related to the total error in the TTI calculation.

If the time interval between a pair of usable detected irradiance signals is greater than the minimum time interval then the time data and the irradiance data are passed to the calculation function (box 380). If the time interval is less than or equal to the minimum time interval then the pair of irradiance signal is averaged over the time interval. This averaging of the irradiance signals over the time interval further enhances the accuracy of the TTI determination by effectively decreasing the relative noise content of the irradiance signal.

Figure 5:
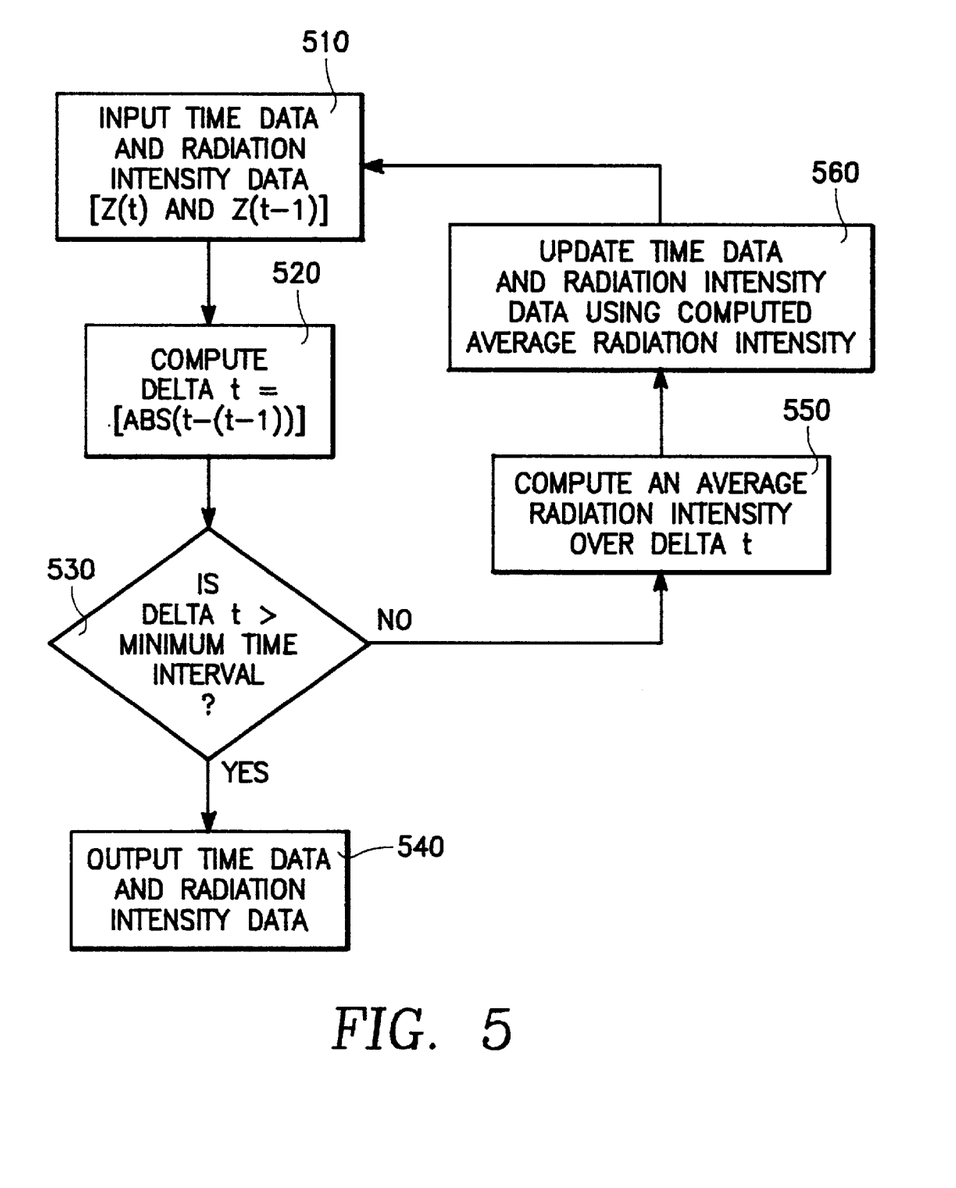
FIG. 5 is a functional flow diagram of a working example of the averaging function of the present invention.

FIG. 5 is a working example of the averaging function of the present invention. In this example, the time interval (delta t) is the interval between a pair of usable detected irradiance signals (for example, greater than a SNR threshold value as defined in the noise threshold function). In mathematical terms, the delta t is equal to the absolute value of $t_n$ minus $t_{n-1}$, where $t_n$ and $t_{n-1}$ are the respective times at which usable irradiance signal measurements have been made.

In box 510 the averaging function receives time data and irradiance data. In this example, the irradiance signal data is again represented by measured detected irradiance, $Z_n$ and $Z_{n-1}$ at times $t_n$ and $t_{n-1}$. Delta t is computed in box 520 by, for example, subtracting $t_{n-1}$ from $t_n$. In box 530 delta t is compared to a minimum time interval. If delta t is greater than the minimum time interval, then the time data and the detected irradiance data from the averaging function are sent by box 540 (for example, to the calculation function). If delta t is less than or equal to the minimum time interval then an average of the detected irradiances are computed over the time interval delta t in box 550. This average detected irradiance value is used in box 560 to update the time data and the detected irradiance data.

Calculation Function

The calculation function can be implemented within the calculation module 260 of FIG. 2. As shown in FIG. 3, the calculation function includes the calculation of the TTI (box 380) and is performed if the time is greater than a minimum time interval (box 360). The calculation function calculates the TTI using only sequential (in time) irradiance measurements, thus eliminating the need to calculate the range or closing velocity between the radiating source and the target object. This greatly simplifies and increases the speed of the TTI calculation while providing is improved accuracy.

In addition, the calculation function includes signal strength normalization to eliminate any effects of the radiating source size. Thus, whether the radiating source is large or small is irrelevant in the TTI calculation. Moreover, the calculation of the TTI is easier and more accurate because, as explained further below, the calculation function assumes that the radiating source has either a constant acceleration or a constant velocity.

In general the calculation function uses a fundamental equation derived from first principle physics that relates the irradiance of a radiating source to the TTI. If constant acceleration is assumed, an equation can be derived that uses time data, irradiance data and an empirical constant to calculate the TTI. If a constant velocity is assumed, then a different equation can be derived and used to calculate the TTI using time data and irradiance data. Both the constant acceleration and constant velocity equations include a ratio of a pair of measured irradiance signals. The TTI calculation is discussed in greater detail below in the mathematical description of the invention section and the working example section.

Update Function

The update function of the present invention can be implemented within the update module 270 of FIG. 2. As shown in FIG. 3, after the TTI has been calculated the update function (box 390) updates the earlier TTI value. Preferably, after every TTI calculation a previous value of the TTI is updated with a current TTI value. Because the radiating source is approaching the target object the irradiance signal is stronger and contains less noise, and the accuracy of the TTI calculation should be improving over time. Thus, constantly updating the TTI calculation provides continuously improving TTI calculations as the radiating source approaches the target object.

IV. Mathematical Basis of the Invention

The TTI calculation is derived from first principle physics and the ability of present day detectors to produce an electrical response in accurate proportion to the radiation incident on the detector.

Irradiance (H) of a radiating source is defined as the incident radiation per unit area and is given in units of wafts per square centimeter ($W/cm^2$). Radiant intensity of the radiating source, J, is a radiant flux per unit solid angle and is given in units of wafts per steradian (W/sr). From first-principle physics, the irradiance of the detected radiating source is related to the distance the radiating source is from the target object(range, R) by the following equation:

$$H(t) = J(t)\frac{e^{-\alpha R(t)}}{R(t)^2} \quad (1)$$

Where:

J(t)=radiating source radiance, time-dependent, W/sr

R(t)=slant range to radiating source, or distance from intercept, m

H(t)=detected irradiance of radiating source, W/cm$^2$ a=atmospheric absorption coefficient, m$^{-1}$ t=elapsed time in flight, sec, =total flight time-time to go =$t_{fl}$-$t_{go}$ Equation (1) is the fundamental equation relating the irradiance of the radiating source to the distance between the radiating source and the target object. In this derivation, the irradiance and the attenuation due to atmospheric absorption are constant over the time interval when detection measurements are made. The development of the equation relating the TTI to the irradiance of the radiating source depends on whether a constant acceleration assumption or a constant velocity assumption is used.

Constant Acceleration Assumption

A constant acceleration assumption is valid if the radiating source is either in constant acceleration or deceleration. For example, if the radiating source is a missile, the constant acceleration assumption is usually valid because missiles accelerate and decelerate due to aerodynamic forces (such as drag and propulsion) and in-flight maneuvers.

Where the radiating source is a missile, developing the constant acceleration assumption equation, R(t)=$R_{slant}$−(at$^2$/2)−Vt, where a is a constant acceleration and V is the velocity at the start of the missile's flight such that V=V(0)+at=at, and R(0)=3at$_{fl}^2$/2 =$R_{slant}$. This leads to the equation:

$$H(t) = \frac{4JA}{[2R_{slant} - 3at^2]^2} \quad (2)$$

In this example, the detected irradiance of the missile, H(t), is converted to a measured amplitude (Z) using the formula, Z(t)=CH(t), where C is a constant conversion factor. Equation (2) then becomes:

$$Z(t) = \frac{4CJA}{[2R_{slant} - 3at^2]^2} = \frac{k}{[2R_{slant} - 3at^2]^2} \quad (3)$$

Where k=4CJA.

Equation (3) can be exploited by considering the relative change of amplitude, (dZ/dt):

$$\frac{dZ(t)}{dt} = \frac{12kat}{[2R_{slant} - 3at^2]^3} \quad (4)$$

The ratio of measured amplitude to change in amplitude becomes:

$$\frac{dZ/dt}{Z(t)} = \frac{2R_{slant} - 3at^2}{12at} \quad (5)$$

Substituting $t_{fl}$-$t_{go}$ for t and 3at$_{fl}^2$/2 for $R_{slant}$ results in equation (6):

$$\frac{dZ/dt}{Z(t)} = \frac{t_{go}[2t_{fl} - t_{go}]}{4[t_{fl} - t_{go}]} \quad (6)$$

Equation (6) relates the measured irradiance to the TTI and shows that the TTI is proportional to the ratio of the detected irradiance of the radiating source with respect to the rate of change of the detected irradiance. In addition, equation (6) is not a function of k and therefore does not need to know the radiating source size, the weather conditions or the velocity of the radiating source to determine the TTI.

Equation (6) can be rewritten in a form that is useful with irradiance data that is discretely sampled (either periodically or aperiodically), by considering the average measured amplitude over a sampling time interval, Δt. A numerical differentiation formula gives the TTI at the midpoint of this sampling time interval as follows:

$$\hat{t}_{go} = \frac{2\Delta t(Z_n + Z_{n-1})[t_{fl} - t_{go}]}{(Z_n - Z_{n-1})[2t_{fl} - t_{go}]} = \frac{\Delta tc(Z_n + Z_{n-1})}{(Z_n - Z_{n-1})} \quad (7)$$

Where c=2($t_{fl-t_{go}}$)/(2$t_{fl}$-$t_{go}$). For implementation, c is chosen to be constant depending on the calculated TTI. Since $t_{go}$ ranges from 0 seconds (at impact) to $t_{fl}$ seconds (at launch), c can range from 0 to 1.0 For example, in this working example, the value of c is approximately 0.67 for initial samples, and approximately 0.86 after two seconds of time has elapsed. In addition, the signal strength normalization provided by equation (7) means that $Z_n$ can be measured in convenient units without the need for extensive calibration of the detection system or preamplifier gain.

Note that Equation 13, like other equations to follow, use sample-data notation wherein $t_{n-1}$ refers to a value of t at one prior sample interval, and $t_n$ refers to a value of t at the current time, etc. This notation is adopted for convenience of expression, and applies to either digital or analog computations, and to periodic or aperiodic sampling.

Constant Velocity Assumption

A constant velocity assumption is valid if the radiating source is moving at a constant velocity. R(t)=Vt, where V is a constant velocity and is time t=0 is impact between the missile and the target object such that R(0)=0. This leads to the equation:

$$H(t) = \frac{JA}{[Vt]^2} \quad (8)$$

Similar to the constant acceleration assumption, the detected irradiance of the missile, H(t), is converted to a measured amplitude (Z) using the formula, Z(t)=CH(t), where C is a constant conversion factor. Equation (8) then becomes:

$$Z(t) = \frac{CJA}{[Vt]^2} = \frac{k}{t^2} \quad (9)$$

Where:

$$k = \frac{CJA}{V^2} \quad (10)$$

Equation (10) can be exploited by considering the relative change of amplitude, (dZ/dt):

$$\frac{dZ(t)}{dt} = \frac{-2 \cdot k}{t^3} \quad (11)$$

The ratio of measured amplitude to change in amplitude leaves a simple result that directly expresses measured amplitude in terms of time:

$$\frac{Z(t)}{dZ/dt} = \frac{kt^{-2}}{-2kt^{-3}} = -\frac{t}{2} \quad (12)$$

Similar to the constant acceleration assumption, equation (12) is not a function of k and therefore the radiating source size, weather conditions or the velocity of the radiating source are not needed for the TTI calculation.

Equation (12) can be rewritten in a form that is useful for discretely sampled (either periodically or aperiodically) irradiance data by considering the average measured amplitude over a sampling time interval, $\Delta t$. A numerical differentiation formula gives the TTI at the midpoint of this sampling time interval as follows:

$$\hat{t}_{go} = \frac{(Z(t_n) + Z(t_{n-1}))}{(t_n - t_{n-1})(Z(t_n) - Z(t_{n-1}))} \quad (13)$$

The signal strength normalization provided by equation (13) means that $Z_n$ can be measured in convenient units without the need for extensive calibration of the detection system or preamplifier gain.

V. Working Example

In order to create data for this working example, actual proprietary IR sensor data and a linear least squares analysis was used. Actual digitized IR sensor data was analyzed using a linear least squares analysis that determines the best $\hat{k}$ that minimizes the error in equation A1.

$$\|Z_n - \hat{Z}_n\|_2 \quad (A1)$$

where $\|\cdot\|_2$ is the Euclidean norm, $Z_n$ is the measured amplitude given by the equation:

$$Z(t_n) = \frac{k}{t_n^2} + w_n \quad (A2)$$

and $\hat{Z}_n$ is the predicted measurement based on the equation:

$$\hat{Z}_n = \frac{\hat{k}}{t_n^2} \quad (A3)$$

If We let H be a matrix representation of $1/t_n^2$, and Z be a matrix representation of the measured values, then we solve:

$$\hat{k} = (H^T H)^{-1} H^T Z \quad (A4)$$

The standard deviation of the detected and system noise, w, was determined as the standard deviation of $Z_n - \hat{Z}_n$ using the $\hat{k}$ calculated in equation (A4).

A $\hat{k}$ of 1500 represents a radiating source that can be detected 4 seconds prior to intercept. The standard deviation of the system noise is 33.8. For algorithm implementation, six (6) measurements are averaged per TTI calculation.

Constant Acceleration Assumption

After data was obtained for this working example, a threshold SNR value was determined. Predicted TTI degrades rapidly as TTI increases. This indicates the necessity for a threshold SNR value at which the predicted TTI becomes valid. The SNR is defined as:

$$SNR = -20\log\left[\frac{Z}{\sigma_w}\right] \quad (A5)$$

where $\sigma_w$ is the variance of the white Gaussian noise, w. The error, $\epsilon$, on TTI is given as:

$$\epsilon = t_{go} - \hat{t}_{go} \quad (A5)$$

where $t_{go}$ is the actual TTI and $\hat{t}_{go}$ is the predicted TTI given in equation 13.

A SNR of 23 dB corresponds to an $\epsilon$ of +/−0.36 seconds and is approximately one seconds prior to intercept. The resolution of the predicted TTI is related to the sample time. Because the averaging function was not used in this working example, and the chosen sample time was 0.5 second, the resolution on predicted TTI can be further improved by interpolating and averaging between samples with the system clock.

The TTI algorithm was applied to 7820 runs of the simulated data. The critical time to be determined was 1.5 seconds. The $\hat{t}_{go}$ error had the following characteristics:

TABLE 1

| | |
|---|---|
| Standard Deviation | 0.24 second |
| Median value | 0.23 second |
| Maximum error | 0.70 second |

In this working example, the present invention correctly predicted the 1.5 second value to within 0.4 second 97% of the time. In addition, it should be noted that the present invention had a tendency to underestimate $\hat{t}_{go}$. This slightly early prediction is generally preferable, however, to a late prediction since a slightly early release of a flare or decoy is still acceptable.

Constant Velocity Assumption

After data was obtained for this working example, a threshold SNR value was determined. Predicted TTI degrades rapidly as TTI increases. This indicates the necessity for a threshold SNR value at which the predicted TTI becomes valid. The SNR is defined as:

$$SNR = -20\log\left[\frac{Z}{\sigma_w}\right] \quad (A5)$$

where $\sigma_w$ is the variance of the white Gaussian noise, w. The error, $\epsilon$, on TTI is given as:

$$\epsilon = t_{go} - \hat{t}_{go} \quad (A5)$$

where $t_{go}$ is the actual TTI and $\hat{t}_{go}$ is the predicted TTI given in equation 13.

A SNR of 27 dB corresponds to an $\epsilon$ of +/−0.25 second and is approximately two seconds prior to intercept. The resolution of the predicted TTI is related to the sample time. Because the averaging function was not used in this working example, and the chosen sample time was 0.5 second, the resolution on predicted TTI can be further improved by interpolating and averaging between samples with the system clock.

The TTI algorithm was applied to 7789 runs of the simulated data. The critical time to be determined was 1.5 seconds. The $\hat{t}_{go}$ error had the following characteristics:

TABLE 1

| Standard Deviation | 0.1001 second |
|---|---|
| Median value | 0.0073 second |
| Maximum error | 0.5325 second |

In this working example, the present invention correctly predicted the 1.5 second value to within 0.25 second 97% of the time. In addition, it should be noted that the present invention had a tendency to underestimate $\hat{t}_{go}$. This slightly early prediction is generally preferable, however, to a late prediction since a slightly early release of a flare or decoy is still acceptable.

The foregoing description has described the principles, preferred embodiments and modes of operation of the present invention. However, the invention should not be construed as being limited to the particular embodiments or working examples discussed herein. As an example, the above-described invention can be used with other types of systems utilizing TTI determination, as well as missile warning systems. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of determining a time-to-intercept for a radiation source using irradiance values of the radiation source, the method comprising:
   computing the time-to-intercept using at least three irradiance values; and reducing noise in the time-to-intercept computation by using a continuously-updated calculation, based upon recent values, and upon initial values;
   where, performing the calculation comprises determining a signal-to-noise ratio (SNR) value of each irradiance value and rejecting from the calculation an irradiance value having a SNR value that is less than a threshold SNR value.

2. The invention as set forth in claim 1, wherein each irradiance value is a respective detected irradiance value of the radiation source.

3. The invention as set forth in claim 1, wherein the threshold signal-to-noise ratio value can be 27 decibels.

4. The invention as set forth in claim 1, further comprising: filtering of each irradiance value to reduce noise in the irradiance values.

5. The invention as set forth in claim 4, wherein: filtering of the irradiance values is continuous; and each irradiance value is a respective detected irradiance value of the radiation source.

6. The invention as set forth in claim 1, further comprising:
   determining whether a time interval between irradiance values is greater than a minimum time interval;
   computing an average irradiance value over the time interval if the time interval is greater than the minimum time interval.

7. The invention as set forth in claim 1, wherein calculating the time-to-intercept further comprises:
   using an equation relating the irradiance values to the time-to-intercept.

8. The invention as set forth in claim 7, wherein the equation uses signal strength normalization.

9. The invention as set forth in claim 8, wherein:
   signal strength normalization includes having a ratio of the irradiance values;
   each irradiance value is a respective radiation intensity value of the radiation source.

10. The invention as set forth in claim 7, wherein the equation is derived using a constant acceleration assumption.

11. The invention as set forth in claim 7, wherein the equation is derived using a constant velocity assumption.

12. The invention as set forth in claim 1, wherein computing the time-to-intercept further comprises:
    computing a first time-to-intercept value using first and second irradiance values; and
    updating the time-to-intercept by computing a second time-to-intercept value using a third irradiance value taken later in time than the first and the second irradiance values.

13. The invention as set forth in claim 12, further comprising: repeating the time-to-intercept updating with subsequent irradiance values that are later in time until a predetermined time-to-intercept value is reached.

14. A method for determining a time-to-intercept for a radiation source, comprising:
    providing irradiance data relating to the radiating source;
    minimizing noise associated with the irradiance data so as to provide usable irradiance data;
    computing the time-to-intercept using the usable irradiance data; and
    updating the time-to-intercept computation using updated usable irradiance data derived from the updated irradiance data;
    where, minimizing noise comprises determining a signal-to-noise ratio (SNR) value of each irradiance value and declaring an irradiance value to be a usable irradiance value if the SNR value is greater than a threshold SNR value.

15. The invention as set forth in claim 14, wherein irradiance data includes a detected irradiance of the radiation source.

16. The invention as set forth in claim 14, wherein irradiance data is provided as one of: (a) a continuous data stream; or (b) a periodically sampled data set; or (c) an aperiodically sampled data set.

17. The invention as set forth in claim 14, wherein computing the time-to-intercept further comprises using an equation having signal strength normalization.

18. The invention as set forth in claim 17, wherein the equation assumes a constant acceleration.

19. The invention as set forth in claim 17, wherein the equation assumes a constant velocity.

20. The invention as set forth in claim 17, further comprising:
    computing a time interval between successive usable irradiance data;
    comparing the time interval to a minimum time interval; and
    averaging the irradiance data over the time interval if the time interval is approximately less than the minimum time interval.

21. A system for determining a time-to-intercept of a radiation source, comprising:
   a detection system detecting successive irradiance values of the radiation source;
   a calculation module that calculates the time-to-intercept using the irradiance values output from said detection system; and
   an update module that updates the time-to-intercept calculation using irradiance values that are advanced in time;
   said detection system comprising a noise module for determining a signal-to-noise ratio (SNR) value of each detected successive irradiance value and for outputting to said calculation module only those irradiance values having a SNR value that is greater than a threshold SNR value.

22. The invention as set forth in claim 21, further comprising: an averaging module that averages irradiance values over a time interval.

23. The invention as set forth in claim 22, wherein the irradiance value is a detected irradiance of the radiation source.

24. The invention as set forth in claim 22, wherein the calculation module uses an equation that assumes constant acceleration.

25. The invention as set forth in claim 22, wherein the calculation module uses an equation that assumes constant velocity.

26. A time-to-intercept processor for determining a time-to-intercept of a radiation source, comprising:
   means for providing irradiance values of the radiance source successively in time;
   means for reducing noise present in the irradiance values to produce usable irradiance values, said noise reducing means comprising means for determining a signal-to-noise ratio (SNR) value of each irradiance value and declaring an irradiance value to be a usable irradiance value if the SNR value is greater than a threshold SNR value; and
   means for calculating the time-to-intercept using the usable irradiance values.

27. The invention as set forth in claim 26, further comprising: means for averaging the us able irradiance values over a time interval if the time interval is less than a minimum time interval.

28. The invention as set forth in claim 26, further comprising:
   an update module for updating the time-to-intercept calculation using irradiance values that are advanced in time.

29. The invention as set forth in claim 28, wherein the means for providing irradiance values is an input module that inputs irradiance values into the time-to-intercept processor.

30. The invention as set forth in claim 29, wherein the input module inputs irradiance values as at least one of: (a) a continuous data stream; (b) a periodically sampled data set; (c) an aperiodically sampled data set.

31. The invention as set forth in claim 26, wherein the means for calculating comprises a calculation module that uses an equation relating the irradiance values to the time-to-intercept.

32. The invention as set forth in claim 31, wherein a constant acceleration is assumed.

33. The invention as set forth in claim 31, wherein a constant velocity is assumed.

34. The invention as set forth in claim 31, wherein the irradiance value is a radiation intensity of the radiation source.

35. A method for determining a time-to-intercept during a time-of-flight of a radiating source, comprising:
   computing a plurality of irradiance values from measurements made from the radiating source, each computation of the irradiance value using a substantially constant value of acceleration a of the radiating source;
   reducing noise in the irradiance values to provide usable irradiance values; and
   computing the time-to-intercept based on usable irradiance values.

36. A method as in claim 35, where reducing noise comprises determining a signal-to-noise ratio (SNR) value of each irradiance value and declaring an irradiance value to be a usable irradiance value if the SNR value is greater than a threshold SNR value.

37. A method for determining a time-to-intercept during a time-of-flight of a radiating source, comprising:
   computing, using a substantially constant value of acceleration a of the radiating source, a measured amplitude $Z(t)$ of an irradiance value $H(t)$ from a measurement made from the radiating source;
   determining a ratio of the measured amplitude to a change in amplitude $dZ(t)/dt$; and
   relating the determined ratio $dZ(t)/dt$ to the time-to-intercept of the radiating source.

38. A method as in claim 37, where the step of computing includes determining a signal-to-noise ratio (SNR) value of each irradiance value and declaring an irradiance value to be a usable irradiance value if the SNR value is greater than a threshold SNR value.

* * * * *